(12) United States Patent
Lu et al.

(10) Patent No.: US 9,020,091 B2
(45) Date of Patent: Apr. 28, 2015

(54) NUCLEAR FUEL ASSEMBLY WITH A LOCK-SUPPORT SPACER GRID

(75) Inventors: Yong Lu, Columbia, SC (US); Xiaoyan Jiang, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 2399 days.

(21) Appl. No.: 12/102,123

(22) Filed: Apr. 14, 2008

(65) Prior Publication Data

US 2009/0257546 A1 Oct. 15, 2009

(51) Int. Cl.
*G21C 3/34* (2006.01)
*G21C 3/352* (2006.01)
*G21C 3/356* (2006.01)

(52) U.S. Cl.
CPC .............. *G21C 3/352* (2013.01); *G21C 3/3424* (2013.01); *G21C 3/3566* (2013.01); *G21Y 2002/20* (2013.01); *G21Y 2002/302* (2013.01); *G21Y 2002/303* (2013.01); *G21Y 2004/301* (2013.01); *Y02E 30/40* (2013.01)

(58) Field of Classification Search
USPC .................................................. 376/438, 462
See application file for complete search history.

(56) References Cited

U.S. PATENT DOCUMENTS

| | | | |
|---|---|---|---|
| 4,587,704 A | | 5/1986 | Matzner et al. |
| 4,597,937 A | * | 7/1986 | Sakurai et al. ................. 376/441 |
| 4,772,447 A | * | 9/1988 | Manson et al. ................ 376/441 |
| 5,133,927 A | * | 7/1992 | Kadano et al. ................ 376/462 |
| 6,278,759 B1 | | 8/2001 | Yoon et al. |
| 6,888,911 B2 | | 5/2005 | Stabel-Weinheimer et al. |
| 7,792,236 B2 | * | 9/2010 | Rozhkov et al. .............. 376/438 |
| 2006/0153327 A1 | * | 7/2006 | Jiang ............................. 376/438 |

FOREIGN PATENT DOCUMENTS

| | | | |
|---|---|---|---|
| JP | 01297594 A | * | 11/1989 |
| JP | H01297594 A | | 11/1989 |

* cited by examiner

*Primary Examiner* — Jack W Keith
*Assistant Examiner* — Marshall O'Connor
(74) *Attorney, Agent, or Firm* — Joseph C. Spadacene; Westinghouse Electric Company LLC

(57) ABSTRACT

An improved grid for a nuclear reactor fuel assembly that has an egg-crate base grid as the primary support structure with each support cell of the base grid that supports a fuel rod having a lock-support sleeve that is rotatable within the support cell between a first and second orientation. In the first orientation the lock-support sleeve fits loosely within the support cell of the base grid and respectively, loosely receives the fuel rods that are loaded therein. The lock-support sleeves are then rotated to a second orientation that locks the fuel rods axially within the support cells.

13 Claims, 6 Drawing Sheets

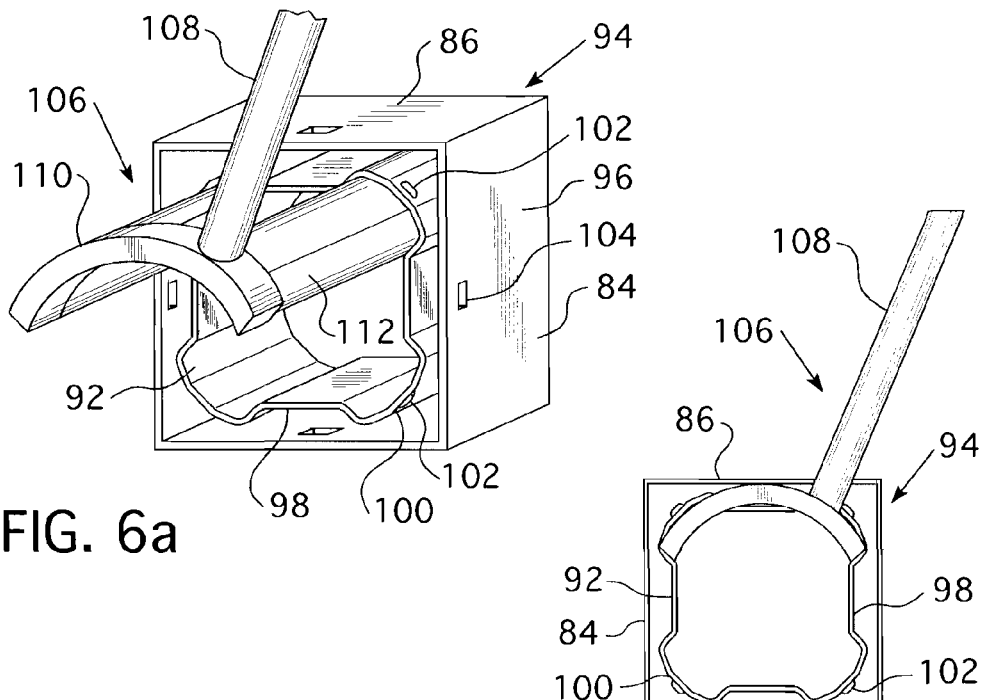
FIG. 6a
FIG. 6b
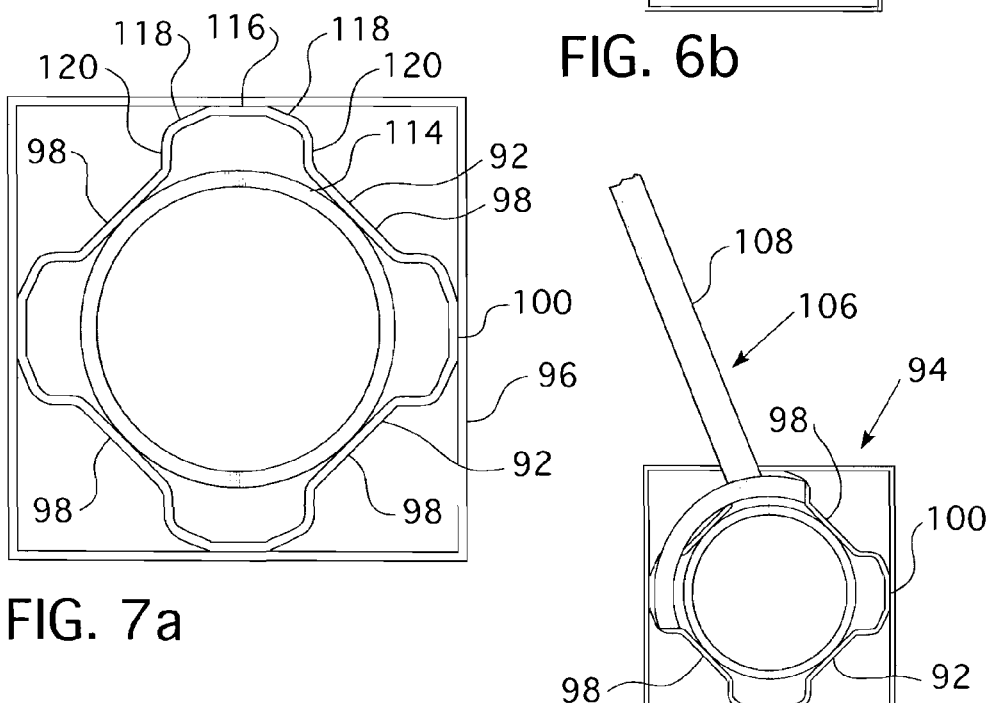
FIG. 7a
FIG. 7b

NUCLEAR FUEL ASSEMBLY WITH A LOCK-SUPPORT SPACER GRID

BACKGROUND OF THE INVENTION

1. Field of the Invention

This invention pertains generally to a nuclear reactor fuel assembly and more particularly to a nuclear fuel assembly that employs a spacer grid that applies pressure to the cladding of the fuel rods after the fuel rods are loaded in the fuel assembly.

2. Description of the Prior Art

The primary side of nuclear reactor power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water is pumped into the vessel 10 by pump 16 through the core 14 where heat energy is absorbed and is discharged to a heat exchanger 18, typically referred to as a steam generator in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

The rectilinearly moveable control rods 28 typically include a drive shaft 50 and a spider assembly 52 of neutron poison rods that are guided through the upper internals 26 and into aligned fuel assemblies 22 by control rod guide tubes 54. The guide tubes are fixedly joined to the upper support assembly 46 and connected by a split pin 56 force fit into the top of the upper core plate 40. The pin configuration provides for ease of guide tube assembly and replacement if ever necessary and assures that the core loads, particularly under seismic or other high loading accident conditions are taken primarily by the support columns 48 and not the guide tubes 54. This support column arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core support plate 60 in the core region of the nuclear reactor (the lower core support plate 60 is represented by reference character 36 in FIG. 2). In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 3 the grids 64 are conventionally formed from orthogonal straps that are interleafed in an egg crate pattern with the adjacent interface of four straps defining approximately square support cells through which the fuel rods 66 are supported in transversely spaced relationship with each other. In many conventional designs springs and dimples are stamped into the opposing walls of the straps that form the support cells. The springs and dimples extend radially into the support cells and capture the fuel rods therebetween; exerting pressure on the fuel rod cladding to hold the rods in position. Also, the assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission by-products from entering the coolant and further contaminating the reactor system.

To control the fission process, a number of control rods 78 are reciprocally moveable in the guide thimbles 54 located at predetermined positions in the fuel assembly 22. Specifically, a rod cluster control mechanism 80 positioned above the top nozzle 62 supports the control rods 78. The control mechanism has an internally threaded cylindrical hub member 82 with a plurality of radially extending flukes or arms 52. Each arm 52 is interconnected to the control rods 78 such that the control rod mechanism 80 is operable to move the control rods vertically in the guide thimbles 54 to thereby control the fission process in the fuel assembly 22, under the motive power of control rod drive shafts 50 which are coupled to the control rod hubs 82, all in a well-known manner.

As previously mentioned, the fuel assemblies are subject to hydraulic forces that exceed the weight of the fuel rods and thereby exert significant forces on the fuel rods and the fuel assemblies. In addition, there is significant turbulence in the coolant in the core caused by mixing vanes on the upper surfaces of the straps of many grids, which promote the transfer of heat from the fuel rod cladding to the coolant. The substantial flow forces and turbulence can result in severe fretting of the fuel rod cladding if motion of the fuel rods is not restrained. Fretting of the fuel rod cladding can lead to a breach and expose the coolant to the radioactive byproducts within the fuel rods. Furthermore, when the fuel rods are first loaded within the fuel assemblies and are inserted through the support cells and by the springs and dimples the surface of the cladding can become marred which can promote corrosion which can also lead to fuel cladding failure.

Thus, an improved means of supporting the fuel rods within a fuel assembly grid is desired that will better restrain the rods without scarring the cladding during fuel assembly manufacturer.

SUMMARY OF THE INVENTION

This invention achieves the foregoing objectives by providing an improved nuclear fuel assembly for supporting a parallel array of a plurality of elongated nuclear fuel rods between a lower nozzle and an upper nozzle having an axial length along the elongated dimension of the nuclear fuel rods. A plurality of spaced, improved support grids are arranged in tandem along the axial length of the fuel rods between the upper nozzle and the lower nozzle, at least partially enclosing an axial portion of the circumference of each fuel rod within a support cell of the support grids to maintain the lateral spacing between fuel rods. The improved support grid is made up essentially of an egg-crate base grid having a plurality of orthogonal intersecting straps that define the support cells at the intersection of each of the four adjacent straps that surround the nuclear fuel rods. A length of each strap between the intersections of the four adjacent straps forms a wall of the corresponding support cell. A lock-support sleeve fits within at least one of the support cells and preferably all of the support cells that support fuel rods and is adapted to have a first orientation that loosely receives a corresponding nuclear fuel rod therethrough and a second orientation that places a transverse pressure on the fuel rod to restrain the fuel rod axially and radially; the lock-support sleeve being rotatable between the first orientation and the second orientation.

In one embodiment, at least one wall of the base grid cooperates with a wall on the lock sleeve to restrain rotation of the lock-support sleeve when the lock-support sleeve is rotated to the second orientation. The means for restraining rotation of the lock-support sleeve may be one of a male or female lock member on at least one wall of the support cell and another of the male or female lock member on at least one wall of the lock-support sleeve. The male and female member may respectively be a protrusion and a hole, wherein the protrusion is sized to fit within the hole when aligned. Preferably, the means for restraining rotation of the lock-support sleeve when the lock-support sleeve is rotated in the second orientation also restrains the axial movement of the lock-support sleeve relative to the support cell when the lock-support sleeve is in the second orientation. Desirably, the means for restraining the axial movement of the lock-support sleeve relative to the support cell does not restrain thermal growth or growth as a result of irradiation, in the axial direction.

In one embodiment, the lock-support sleeve is a quasi four-sided sleeve having generally rounded corners that are bulged out radially with walls of the lock-support sleeve extending between the bulged out corners. The circumferential contour of the lock-support sleeve is so configured that when the lock-support sleeve is rotated from the first orientation where the corners are substantially aligned with the intersection between straps, to the second orientation wherein the corners are substantially aligned with a mid-section in the walls of the support cell between the intersections between the adjacent straps, at least two walls of the lock-support sleeve move radially inward to place a lateral force on the corresponding fuel rod and restrain the fuel rod axially. Preferably when the lock-support sleeve is rotated to the second orientation all four walls of the lock-support sleeve bend radially inward to place a lateral force on the corresponding fuel rod and restrain the fuel rod axially. Desirably, when at least one wall of the lock-support sleeve bends radially inward it makes contact with the fuel rod over the entire height of the lock-support sleeve.

In still another embodiment the height of a wall of the support cells that support fuel rods is longer in the axial direction than the corresponding height of a wall of the lock-support sleeve. Preferably, the additional height of the support cells accommodates a removable stop that is appended to a lower portion of at least one wall of the lock-support sleeve outside of the path of the fuel rod that extends through the lock-support sleeve. The removable stop supports the lock-support sleeve in the axial direction when the lock-support sleeve is in the first orientation. Preferably the removable stop is a positioning bar that passes through and is supported by openings in the lower portion of two walls of the lock-support sleeve; desirably, two opposing walls of the lock-support sleeve. In one preferred embodiment the removable stop comprises at least two positioning bars, one on either side of the fuel rod path.

This invention further includes a method of loading a fuel rod into an elongated nuclear fuel assembly skeleton having an axial direction along the longitudinal dimension of the fuel assembly. The fuel assembly skeleton includes a bottom nozzle, a plurality of transversely spaced thimble tubes attached at one end to the bottom nozzle and extending up axially towards a top nozzle that will be attached at the other end of the thimble tubes once an array of fuel rods are inserted into the fuel assembly skeleton. A plurality of spaced support grids are arranged in tandem along the axial length of the thimble tubes and attached to at least some of the thimble tubes. The support grids are designed to at least partially enclose an axial portion of the circumference of each fuel rod within a support cell of the support grids to maintain lateral spacing between fuel rods. At least one of the support grids is made up, at least in part, of an egg-crate base grid having a plurality of orthogonal intersecting straps that define the support cells at the intersection of each four adjacent straps that surround the nuclear fuel rods. A length of each strap between the intersections of the four adjacent straps forms a wall of the corresponding support cell. A lock-support sleeve fits within at least some of the support cells and is configured to loosely receive a corresponding nuclear fuel rod therethrough in a first orientation and in a second orientation place transverse pressure on the fuel rod to load and restrain the fuel rod axially; the lock-support sleeve being rotatable between the first orientation and the second orientation. Generally the method of this invention includes the steps of: maintaining all of the lock-support sleeves that are in axial alignment, in the first orientation; completely inserting a fuel rod into the fuel assembly through each of the lock-support sleeves in the axially transverse position in the fuel assembly skeleton in which the fuel rod is inserted; and loading the fuel rod to place a transverse pressure on the fuel rod after the fuel rod is completely inserted into the fuel assembly skeleton by moving the lock-support sleeves surrounding the fuel rod to the second orientation.

Preferably, the loading step includes the step of rotating the lock-support sleeve 45° around the support cell. In one embodiment the lock-support sleeve is a quasi four-sided sleeve having generally rounded corners that are bulged out radially. In such case the rotating step includes the steps of capturing at least two adjacent corners of the lock-support sleeve with a tool having fingers which extend within the corresponding bulges and a leverage arm and rotating the leverage arm to rotate the lock-support sleeve within the support cell. Desirably, the rotating step also includes accessing the lock-support sleeve with the tool from an underside of the support grid.

In another embodiment, the method of this invention includes the step of locking the lock-support sleeve in the second orientation. Desirably, prior to the step of completely inserting the fuel rod, the method further includes the steps of inserting a removable positioning bar in a lower portion of the support cell out of the path the fuel rod will occupy when inserted and inserting the lock-support sleeve into the support cell in the first orientation. In this last embodiment the method of this invention further includes the step of removing the positioning bar from the support cell after the lock-support sleeve is moved to the second orientation; preferably after it is locked in that position.

BRIEF DESCRIPTION OF THE DRAWINGS

A further understanding of the invention can be gained from the following description of the preferred embodiments when read in conjunction with the accompanying drawings in which:

FIG. 6a is a perspective view showing the lock-support sleeve of this invention inserted within a support cell in the first orientation with the tool of this invention inserted in the lock-support sleeve to turn the lock-support sleeve to the second orientation;

FIG. 6b is a plan view of FIG. 6a;

FIG. 7a is a plan view of a cross-section of a support cell of this invention with the lock-support sleeve in the second orientation in place around the fuel rod;

FIG. 7b is a plan view of FIG. 7a with the tool of this invention in place;

DESCRIPTION OF THE PREFERRED EMBODIMENTS

Figure 1:
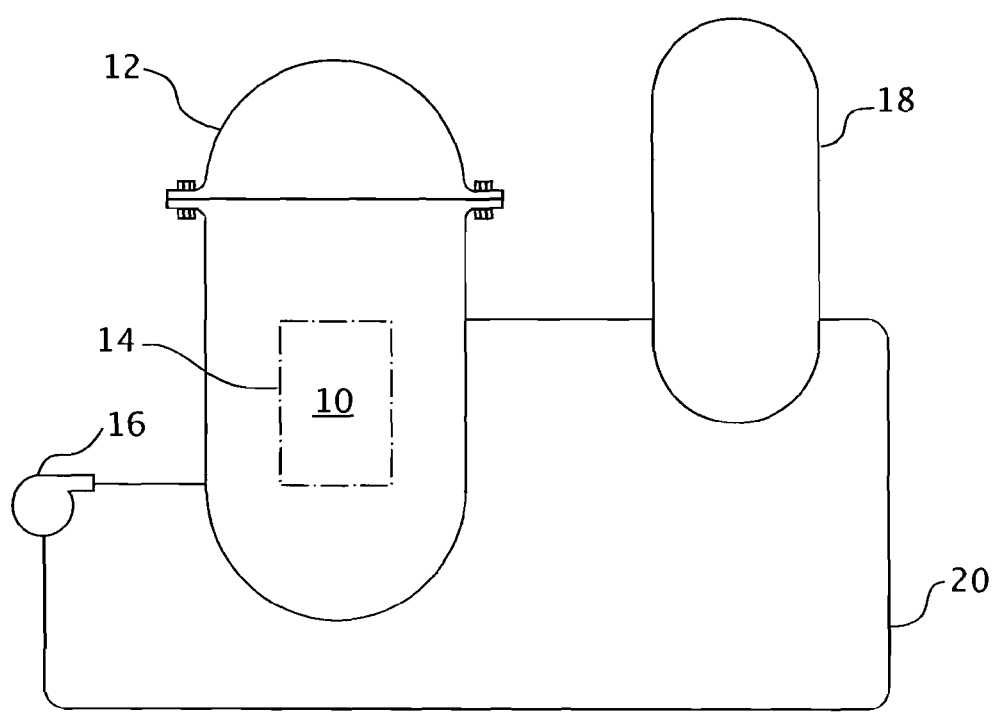
FIG. 1 is a simplified schematic of a nuclear reactor system to which this invention can be applied.
Figure 2:
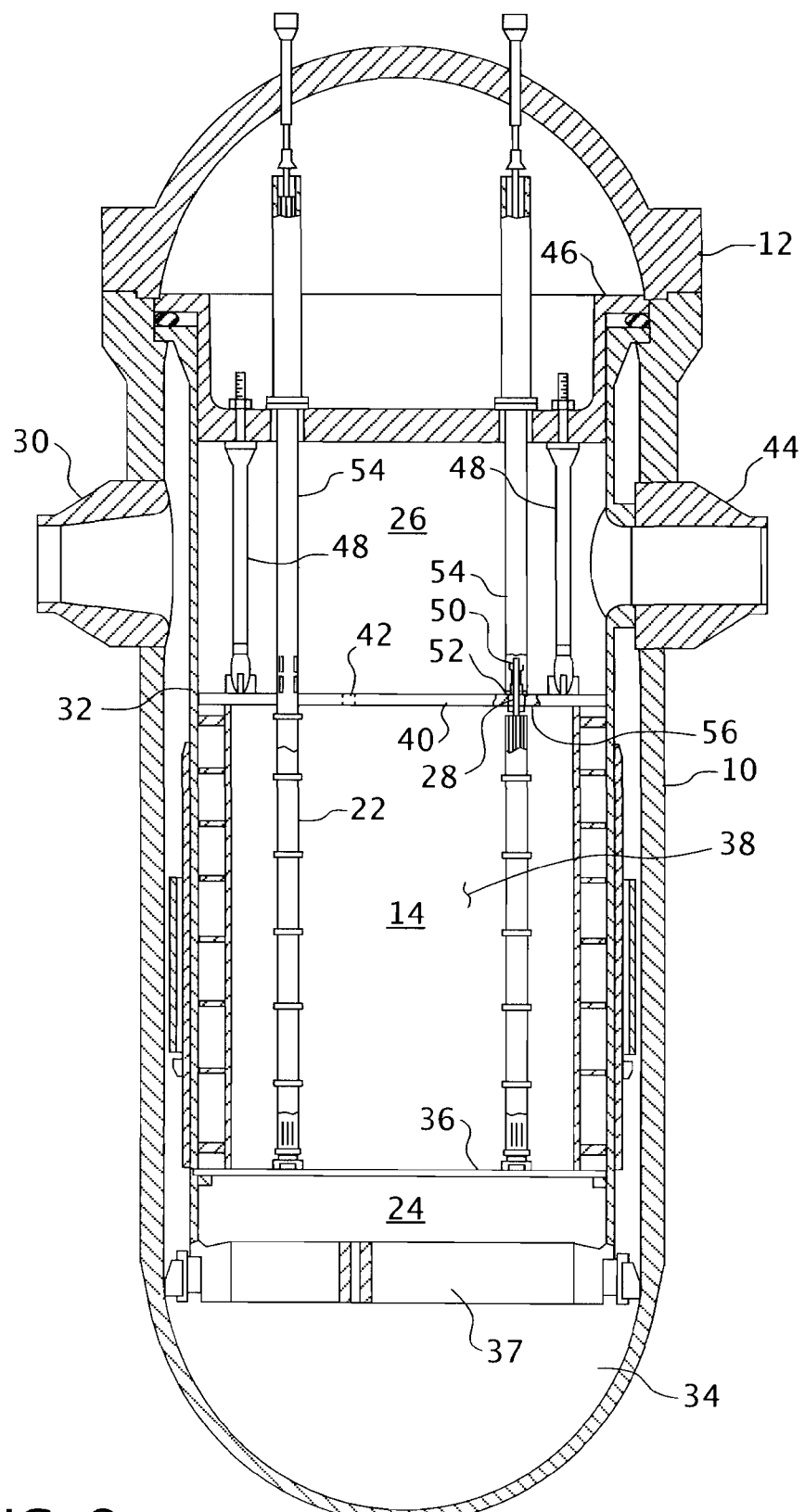
FIG. 2 is an elevational view, partially in section, of a nuclear reactor vessel and internal components to which this invention can be applied.
Figure 3:
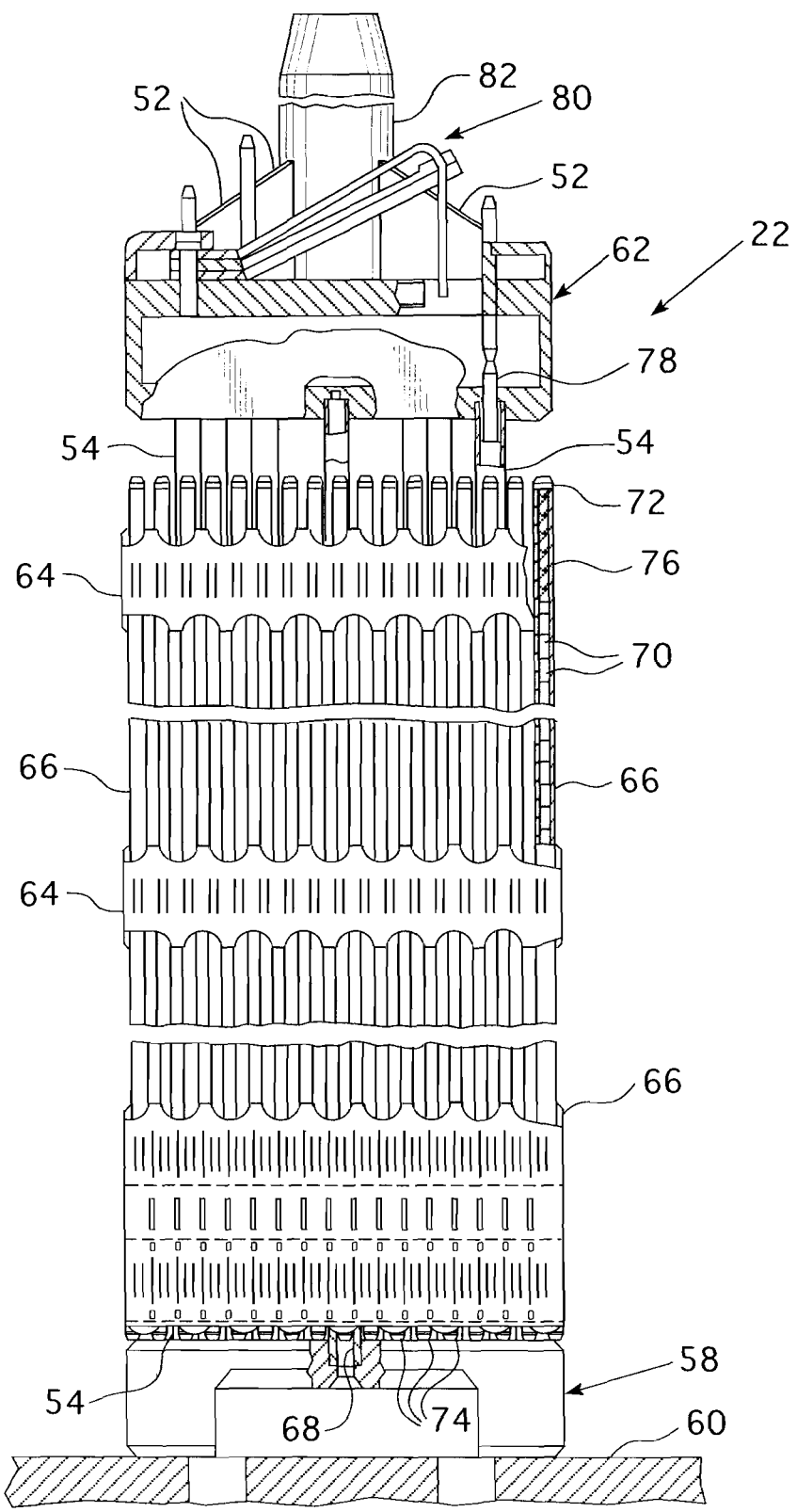
FIG. 3 is an elevational view, partially in section, of a fuel assembly illustrated in vertically shortened form, with parts broken away for clarity.
Figure 4:
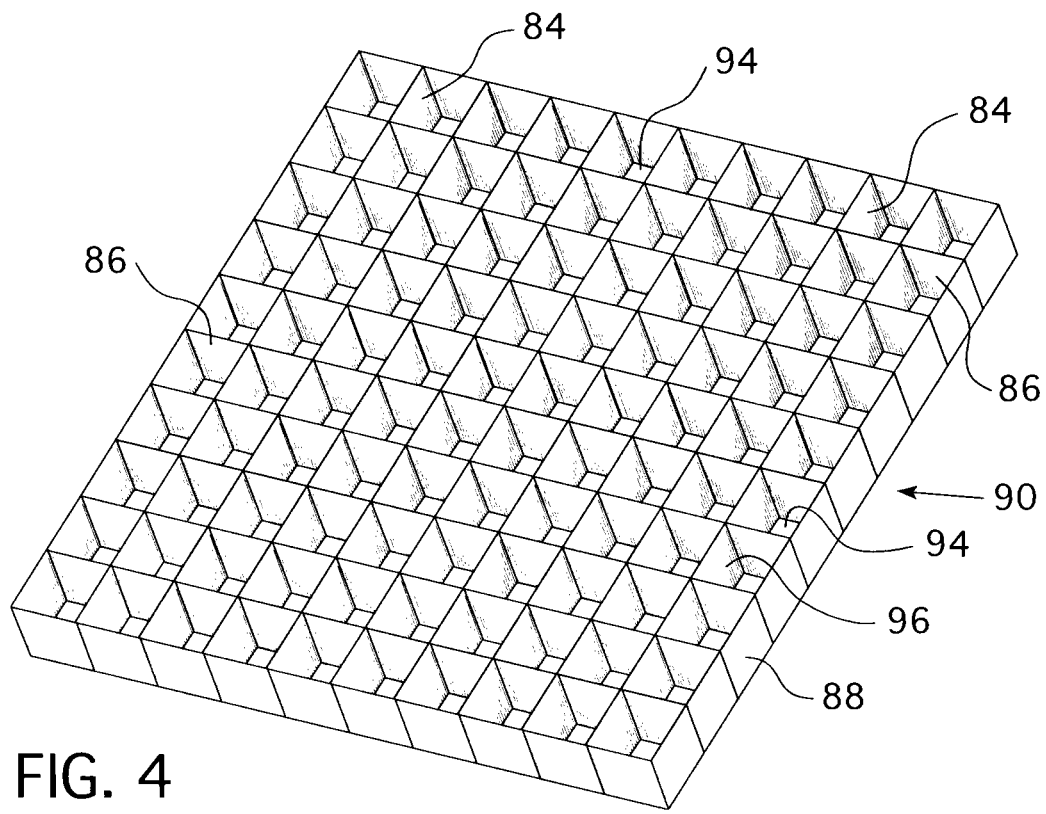
FIG. 4 is a perspective view of the egg-crate base grid of this invention.
Figure 5:
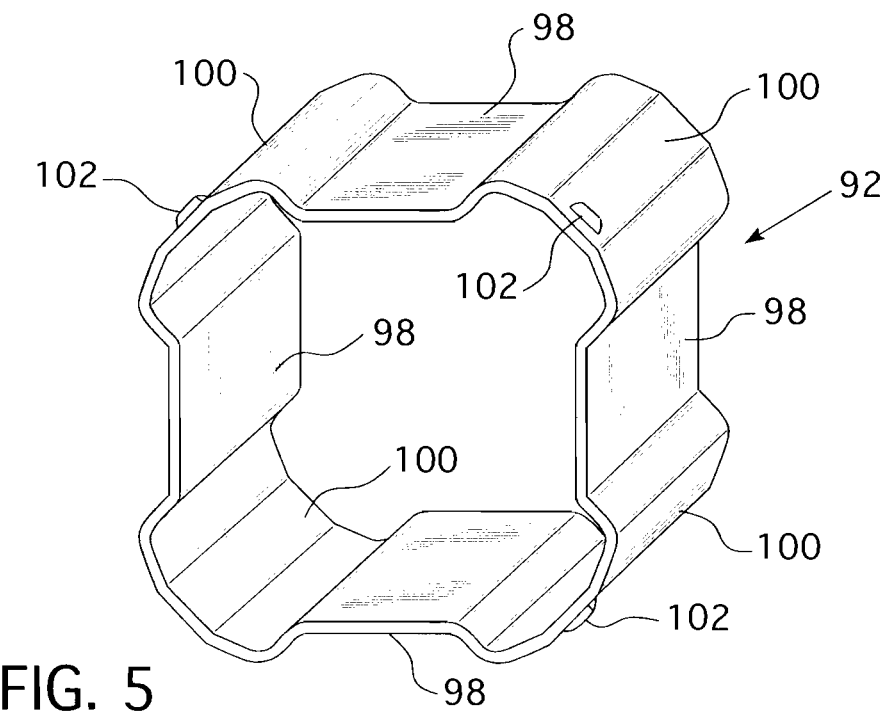
FIG. 5 is a perspective view of the lock-support sleeve of this invention.

This invention provides a new fuel assembly for a nuclear reactor and more particularly an improved spacer grid design for a nuclear fuel assembly. The improved grid is generally formed from an egg-crate base support grid, illustrated in FIG. 4, formed from two orthogonally positioned sets of parallel spaced straps 84 and 86 that are interleafed in a conventional manner and surrounded by an outer strap 88 to form the base support grid 90. The orthogonal straps 84 and 86, and in the case of the outer rows, the outer strap 88 define the support cells 94 at the intersection of each four adjacent straps that surround the nuclear fuel rods. With a length of each strap, along the straps elongated dimension, between the intersections of the four adjacent straps, forming a wall 96 of the support cells 94. Preferably, each base grid support cell 94 that supports a fuel rod has a fuel rod lock-support sleeve the preferred embodiment of which is illustrated in FIG. 5 and represented by reference character 92. Basically, the lock-support sleeve 92 is adapted to fit within at least some of the support cells 94 that support fuel rods and in a first orientation of the sleeve 92 within the support cell 94 the sleeve 92 loosely receives the nuclear fuel rod therethrough. In this orientation the support sleeve has a small clearance with the fuel rod so that the fuel rod may be loaded therethrough without scratches, gall balls or any other damage that is normally encountered when the fuel rods are loaded into conventional spring grids. After a fuel rod is completely inserted through each of its grids and finally positioned within the fuel assembly skeleton the lock-support sleeve 92 may be rotated within the support cells 94 to a second orientation that pressures at least one side wall 98 radially inward to bear a lateral force against the fuel rod and prevent the fuel rod from moving both axially and radially. The sleeves 92 will not be welded to the base grid 90 thus permitting the sleeves 92 to be manufactured from different materials or alloys that can exhibit different axial thermal growth and growth due to irradiation.

In the preferred embodiment the lock-support sleeve is a quasi four-sided sleeve having generally rounded corners 100 that are bulged out radially with the side walls 98 of the lock-support sleeves 92 extending between the bulged out corners 100. As shown, the lock-support sleeve 92 is configured so that when the lock-support sleeve is rotated from a first orientation where the corners 100 are substantially aligned with the intersection between straps 84 and 86, to a second orientation wherein the corners 100 are substantially aligned with a mid-section in the walls 96 of the support cells 94 between the intersection between the orthogonal straps 84 and 86, at least two of the walls 98 of the lock-support sleeve 92 bend radially inward to place a lateral force on the corresponding fuel rod and retain the fuel rod in the axial position in which it was loaded.

As can be seen from FIG. 5 the lock-support sleeve 92 has protrusions 102 which extend radially outward from the corners 100. The protrusions can be readily observed in FIGS. 5, 6a and 6b. FIG. 6a shows a perspective view of a support cell 94 of the base grid 90 viewed from the top of the cell with a lock-support sleeve 92 centered in the cell 94 and engaged with a tool 106 that is employed by this invention to rotate the lock-support sleeve 92 within the support cell 94. The lock-support sleeve 92 is shown in the first orientation with the bulged corners 100 substantially aligned with the intersection between straps 84 and 86, which provides a loose fitting clearance between the side walls 98 of the lock-support sleeve 92 and the fuel rod which is not shown. FIGS. 6a and 6b show the lock-support sleeve 92 engaged by the tool 106 of this invention used to rotate the lock-support sleeve within the support cell 94. The tool 106 has a leverage arm 108 which is attached to a laterally extending wing 110 that has two fingers 112 which, at their distal end are shaped to engage the bulged portion of the corners 100 from the inside of the bulge. The tool can have a flexible handle to facilitate 45° rotation at some difficult to maneuver locations, e.g., around thimble tubes 54. With the tool 106 engaged in the corners 100 the leverage arm 108 can be employed to rotate the lock-support sleeve 92 within the support cell 94. When the lock-support sleeve 92 is rotated 45° to the second orientation wherein the corners 100 are substantially aligned with a mid-section in the walls 96 of the support cells 94 between the intersection between the adjacent straps 84 and 86, the protrusions 102 engage the openings 104 in the support cell walls 96 to lock the lock-support sleeve from further rotation under normal operating conditions. It should be appreciated though, that the lock-support sleeve 92 can be rotated by the tool 106 to unlock the engagement of the protrusions 102 with the openings 104 should it be necessary to unlock the fuel rods for any reason. Accordingly, the protrusions 102 in the openings 104 lock the support sleeve in position in a second orientation to restrain both the axial movement as well as further rotation while permitting differential axial growth between the lock-support sleeve 92 and the support cell 94. It should also be appreciated that other means of locking the lock-support sleeve 92 to the support cell 94 could be employed to accomplish the same purpose. For example, though not as desirable, the protrusions can be extended in a radial inward direction from the walls 96 of the support cell 94 and corresponding openings can be provided in the corners 100 of the lock-support sleeve 92.

FIG. 7a shows a plan view of a lock-support sleeve 94 rotated to the second orientation within the support cell 94 capturing a fuel element 114 against the side walls 98 of the lock-support sleeve 92. The bulged corners 100 have a generally rounded circumference in that they have a central flat section 116 with a slightly angled periphery portion 118 that curves into a radially inward connecting strap 120 that connects to the side wall 98. As the bulged corners are rotated from the first orientation, where they loosely fit within the corners of the support cell 94 (as shown in FIGS. 6a and 6b), to the mid-section of the side wall 96 of the support cell 94, the side walls 96 of the support cells 94 first engage the slightly angled portion 118 of the bulged corners 100, which urges the sides of the lock-support sleeve 98 to move radially inward applying pressure against the cladding of the fuel rod 114. As the lock-support sleeve continues to rotate towards the mid-section of the side wall 96 of the support cell 94 the flat sections of the bulged corners 116 snap into engagement with the side walls 96 and engage the protrusions 102 within the openings 104 to lock the lock-support sleeve 92 in the second orientation. Thus the side walls 98 are brought to bear against the cladding of the fuel rod 114 over the entire length of the side walls 98 securing the fuel rod both axially and radially within the fuel assembly. In the preferred embodiment all four side walls 98 engage the cladding of the fuel rod 114, though it should be appreciated that the concepts of this invention can be employed with two opposing sides 98 of the lock-support sleeve 92 being forced into engagement with the fuel rod 114.

Figure 8:
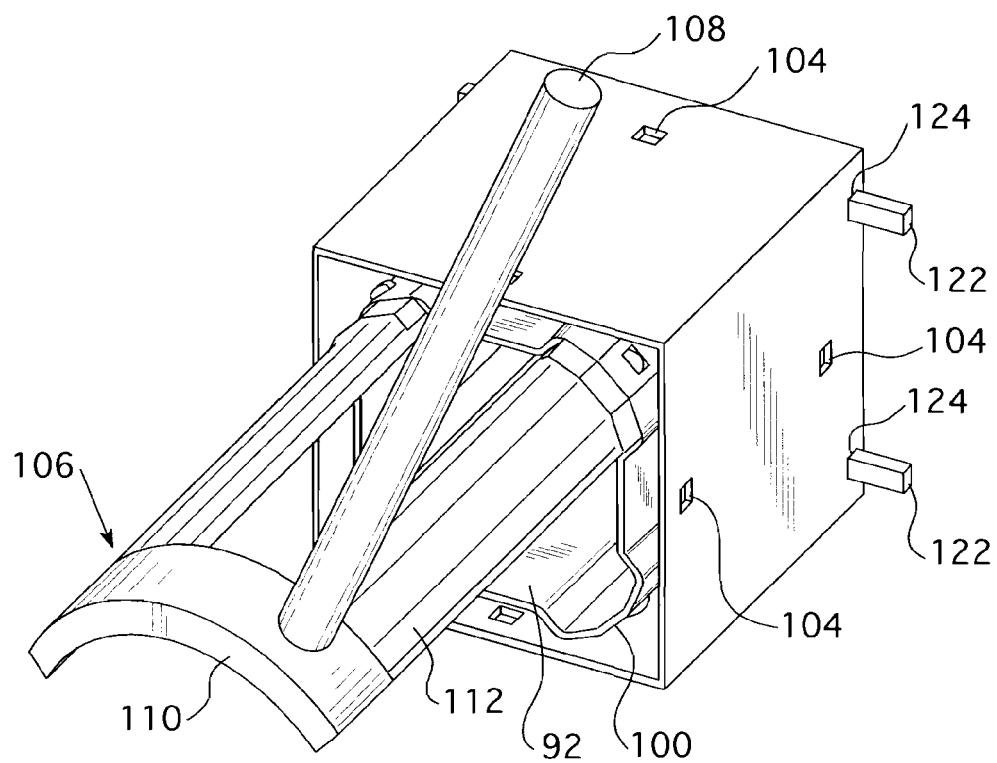
FIG. 8 is a perspective view of a support cell of this invention with the lock-support sleeve inserted in a first orientation and held in position by the tool and support bars of this invention.
Figure 9:
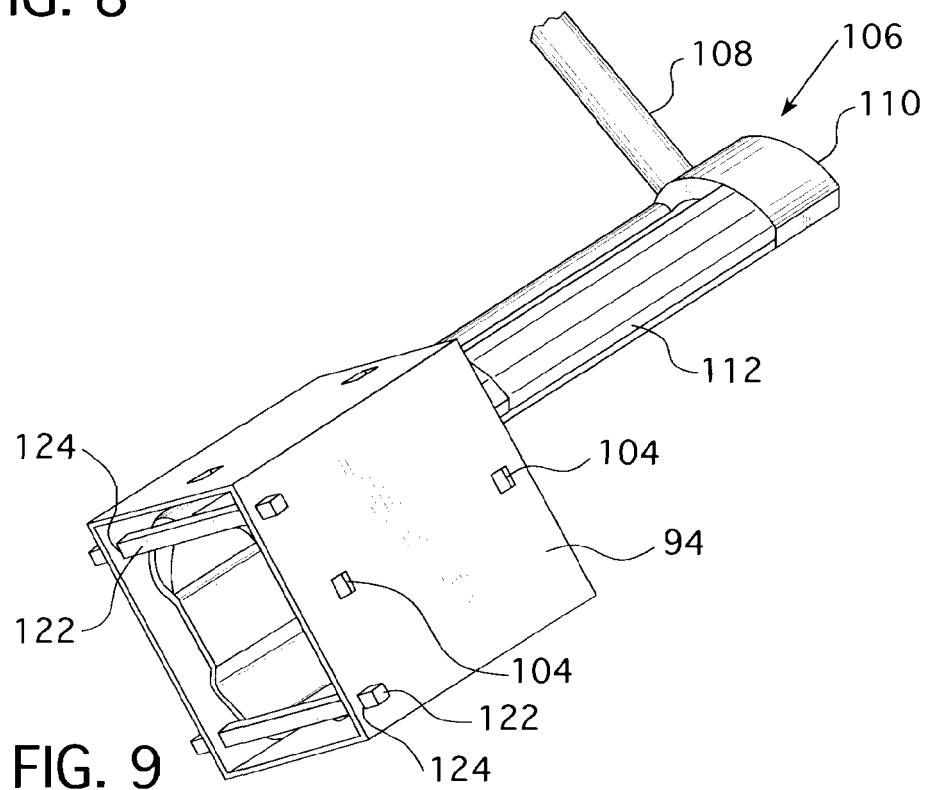
FIG. 9 is another perspective view of that shown in FIG. 8 providing a bottom view of the positioning bars supporting the lock-support sleeve in the first position.

When the lock-support sleeve 92 is positioned within the support cell 94 in the first orientation it is loosely seated in the center of the support cell and a support means has to be provided to prevent the lock-support sleeve from dropping out of the support cell 94. FIGS. 8 and 9 show one such arrangement which can be used for this purpose. FIG. 8 shows a perspective view with the support cell 94 turned on its side with the tool 106 supporting the lock-support sleeve 92 in place within the center of the interior of the support cell 94. FIG. 9 shows the arrangement of FIG. 8, providing a perspective from the bottom side of the support cell 94. From FIG. 9 it can be appreciated that in the arrangement shown in FIGS. 8 and 9 the height of the lock-support sleeve 92 in the axial direction is slightly shorter than the height of the corresponding walls of the support cell 94. This permits positioning bars 122 to be inserted through openings 124 in opposing side walls 96 of the support cell 94 at lateral positions in the lower portions of the support cells 94 out of the path of the fuel rods. The positioning bars 122 thus support the lock-support sleeves 92 axially when the lock-support sleeves 92 are in the first orientation. It should be appreciated that other means for supporting the lock-support sleeve 92 within the support cells 94 can be employed. For example, a portion of the side walls 96 at the lower end of the support cell 94 can be bent inward to serve as such a support. However, the positioning bars 122 are preferred because after the lock-support sleeve is rotated to the second orientation and locked into position, by aligning the protrusions 102 with the mating openings 104, the positioning bars 122 are preferably removed thus reducing the amount of metal that could affect neutron economy and obstructions to coolant flow.

The invention also includes a method of loading a fuel rod into an elongated nuclear fuel assembly skeleton having an axial direction along the longitudinal dimension of a fuel assembly, a bottom nozzle, a plurality of transversely spaced thimble tubes attached at one end to the bottom nozzle and extending up axially toward a top nozzle that will be attached at the other end of the thimble tubes once the array of fuel rods are inserted into the fuel assembly skeleton, and a plurality of spaced support grids arranged in tandem along the axial length of the thimble tubes and attached to at least some of the thimble tubes. The support grids are designed to at least partially enclose an axial portion of the circumference of each fuel rod within a support cell of the support grids to maintain a lateral spacing between fuel rods. At least one of the support grids includes an egg-crate base grid having a plurality of orthogonal intersecting straps that define the support cells at the intersection of each four adjacent straps that surround the fuel rods; a length of each strap between the intersections of the four adjacent straps forming a wall of the corresponding support cell. A lock-support sleeve is adapted to fit within preferably each of the support cells that support fuel elements or rods and in the first orientation loosely receive the fuel rod therethrough. In a second orientation with respect to the base grid, the lock-support sleeve places a transverse pressure on the fuel rod to load and restrain the fuel rod axially, the lock-support sleeve being rotatable between the first orientation and the second orientation. The method including the steps of: maintaining all the lock-support sleeves that are in axial alignment, in the first orientation; completely inserting a fuel rod into the fuel assembly through each of the lock-support sleeves in the axially transverse position in the fuel assembly skeleton in which the fuel rod is inserted; and loading the fuel rod to place a transverse pressure on the fuel rod after the fuel rod is completely inserted into the fuel assembly skeleton, by moving the lock-support sleeve surrounding the fuel rod to the second orientation.

Preferably the loading step includes the step of rotating the lock-support sleeve 92 45° around the support cell 94. In one preferred embodiment the lock-support sleeve 92 is a quasi four-sided sleeve having generally rounded corners that are bulged out radially and the rotating step includes the steps of capturing at least two adjacent corners of the lock-support sleeve 92 with a tool 106 having fingers 112 which extend within the corresponding bulges 100 and a leverage arm 108. The rotating step rotates the leverage arm to rotate the lock-support sleeve 92 within the support cell 94. Preferably the lock-support sleeve 92 is accessed with the tool 106 from the underside of the support cell 94 to avoid damaging any of the coolant swirl vanes extending above the upper side of the support cell 94.

The method of this invention further preferably includes the step of locking the lock-support sleeve in the second orientation. In one embodiment, the method of this invention includes the steps of inserting a removable positioning bar in a lower portion of the support cell 94 out of the path of the fuel rod 114 prior to the step of completely inserting the fuel rod, and inserting the lock-support sleeve 92 into the support cell 94 in the first orientation. Additionally, the latter embodiment includes the step of removing the positioning bar 122 from the support cell 94 after lock-support sleeve 92 is moved to the second orientation.

Because there are four or eight dimples or protrusions 102 on each lock-support sleeve 92 and four or eight cutouts 104 on each support cell 94 of the base grid 90, the lock-support sleeves are locked axially and radially after being rotated. Also, the preload is added between the support sleeve 92 and fuel rod 114 after the rotation step due to the designed shape of the lock-support sleeve 92 and especially the bulged corners 100. The fuel rods can be loaded and the sleeves can be locked row by row. Specific pattern loading of the fuel rods during assembly is not needed since there is no transverse loading force, which could bow the assembly for row-by-row loading. A single rod can be loaded in any special location first. The material and texture (such as transverse) for the base grid 90 will be selected to have less growth radially than the lock-support sleeves 92, therefore, positive contact will be maintained between the fuel rods 114 and the lock-support sleeves 92 even after the fuel assembly is irradiated. The material and shape of the lock-support sleeve 92 are selected to allow more growth in a direction toward the fuel rod 114 to further increase the load between the fuel rod and the lock-support sleeves 92 under irradiation. The sleeve 92 could be made of Inconel to provide the appropriate characteristics under irradiation. To limit the neutron penalty of this material, a hole or notches could be punched into the sleeve if it is made of Inconel.

Thus the support grid of this invention enables loading of the fuel rods while avoiding scratches, gall balls and other surface damage that typically occur during fuel rod loading. Positive preload will be maintained even after the end of the fuel cycle. The lock-support sleeve has four full-length line contacts with the fuel rod that maximizes the contact area and reduces wear due to fretting. None of the support features lift off the rod during reactor operation and the rod will return to the center even under extreme lateral shipping loads. Furthermore, the grid of this invention reduces manufacturing costs because of the reduced number and complexity of stamped features on the grid parts. Mixing vanes can also be added to the top of the base grid straps as in conventional grids to enhance coolant mixing.

While specific embodiments of the invention have been described in detail, it will appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fuel assembly for a nuclear reactor comprising:
   a parallel array of a plurality of elongated nuclear fuel rods supported between a lower nozzle and an upper nozzle and having an axial length along the elongated dimension of the nuclear fuel rods;
   a plurality of spaced support grids arranged in tandem along the axial length of the fuel rods, between the upper nozzle and the lower nozzle, at least partially enclosing an axial portion of the circumference of each fuel rod within a support cell of the support grids to maintain a lateral spacing between fuel rods, at least one of the support grids comprising;
   an egg-crate base grid having a plurality of orthogonal intersecting straps that define the support cells at the intersection of each four adjacent straps that surround the nuclear fuel rods, a length of each strap between the intersections of the four adjacent straps forming a wall of the corresponding support cell, and
   a lock-support sleeve configured to fit within at least one of the support cells and in a first orientation loosely receive the nuclear fuel rod therethrough and in a second orientation place a transverse pressure on the fuel rod to restrain the fuel rod axially, the lock-support sleeve being rotatable within the at least one of the support cells between the first orientation and the second orientation.

2. The nuclear fuel assembly of claim 1 including means for restraining rotation of the lock-support sleeve when the lock-support sleeve is rotated to the second orientation.

3. The nuclear fuel assembly of claim 2 wherein the means for restraining rotation of the lock-support sleeve comprises one of a male or female lock member on at least one wall of the support cell and another of the male or female lock member on at least one wall of the lock-support sleeve.

4. The nuclear fuel assembly of claim 3 wherein the male and female lock member are respectively a protrusion and a hole wherein the protrusion is sized to fit within the hole when aligned.

5. The nuclear fuel assembly of claim 2 wherein the means for restraining rotation of the lock-support sleeve when the lock-support sleeve is rotated to the second orientation also restrains the axial movement of the lock-support sleeve relative to the support cell when the lock-support sleeve is in the second orientation.

6. The nuclear fuel assembly of claim 1 wherein the lock-support sleeve is a quasi four sided sleeve having generally rounded corners that are bulged out radially with walls of the lock-support sleeve extending between the bulged out corners and configured so that when the lock-support sleeve is rotated from the first orientation where the corners are substantially aligned with the intersection between straps to the second orientation wherein the corners are substantially aligned with a midsection in the walls of the support cells between the intersection between the adjacent straps, at least two walls of the lock-support sleeve bend radially inward to place a lateral force on the corresponding fuel rod and restrain the fuel rod axially.

7. The nuclear fuel assembly of claim 6 wherein when the lock-support sleeve is rotated to the second orientation all four walls of the lock-support sleeve bend radially inward to place a lateral force on the corresponding fuel rod and restrain the fuel rod axially.

8. The nuclear fuel assembly of claim 6 wherein at least one wall of the lock-support sleeve that bends radially inward makes contact with the fuel rod over the entire height of the lock-support sleeve wall.

9. The nuclear fuel assembly of claim 1 wherein a height of a wall of the support cells in the axial direction is longer than the corresponding height of a wall of the lock-support sleeve.

10. The nuclear fuel assembly of claim 1 wherein the support cells having a lock-support sleeve fit therein have a removable stop appended to a lower portion of at least one wall of the support cells outside of a path of the fuel rod and in an axial path of the lock-support sleeve, the removable stop supporting the lock-support sleeve in the axial direction when the lock-support sleeve is in the first orientation.

11. The nuclear fuel assembly of claim 10 wherein the removable stop is a positioning bar that passes through and is supported by openings in the lower portion of two walls of the support cell.

12. The nuclear fuel assembly of claim 11 wherein the positioning bar passes through and is supported by openings in the lower portion of two opposing walls of the support cell.

13. The nuclear fuel assembly of claim 10 wherein the removable stop comprises at least two positioning bars, one on either side of the fuel rod path.

* * * * *